United States Patent
Karakane et al.

(10) Patent No.: US 6,492,054 B1
(45) Date of Patent: Dec. 10, 2002

(54) POLYMER ELECTROLYTE FUEL CELL INCLUDING A WATER-RETAINING LAYER ON A RIBBED PLATE

(75) Inventors: Mitsuo Karakane, Oura-Gun (JP); Takashi Yasuo, Hirakata (JP); Shigeru Sakamoto, Oota (JP); Yasunori Yoshimoto, Oura-Gun (JP); Yasuo Miyake, Oura-Gun (JP); Ikuo Yonezu, Hirakata (JP); Koji Nishio, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/451,973

(22) Filed: Nov. 30, 1999

(30) Foreign Application Priority Data

Nov. 30, 1998 (JP) .............................. 10-340653

(51) Int. Cl.[7] .............................................. H01M 8/04
(52) U.S. Cl. ......................................................... 429/34
(58) Field of Search ..................................... 429/30, 34

(56) References Cited

U.S. PATENT DOCUMENTS

| | | | | |
|---|---|---|---|---|
| 4,175,165 A | * | 11/1979 | Adlhart | ............ 429/30 |
| 4,794,043 A | * | 12/1988 | Kaji | ............ 428/408 |
| 5,234,776 A | | 8/1993 | Koseki | |
| 5,332,744 A | | 6/1994 | Koseki | |
| 5,869,202 A | * | 2/1999 | Marchetti | ............ 429/30 |

FOREIGN PATENT DOCUMENTS

| | | | | | |
|---|---|---|---|---|---|
| JP | 358150278 A | * | 9/1983 | ............ H01M/8/02 |
| JP | 63162586 | * | 7/1988 | ............ C04B/38/00 |
| JP | 402184510 A | * | 7/1990 | ............ C04B/35/52 |
| JP | 03124407 A | * | 5/1991 | ............ B29B/11/16 |
| JP | 5-41230 | | 2/1993 | |
| JP | 06060884 A | * | 3/1994 | ............ H01M/4/88 |
| JP | 8-130025 | | 5/1996 | |

* cited by examiner

Primary Examiner—Patrick Ryan
Assistant Examiner—Mark Ruthkosky
(74) Attorney, Agent, or Firm—Merchant & Gould P.C.

(57) ABSTRACT

A water-retaining layer is formed to coat the top of ribs of a ribbed plate which is to be disposed, as a component of a polymer electrolyte fuel cell, on at least one surface of a cell which includes an electrolyte membrane and two electrodes disposed on two surfaces of the electrolyte membrane. The water-retaining layer is formed by: generating a mixture by dissolving a resin-carbon mixture into a solvent; applying the mixture using a spray to a surface of the ribbed plate having the ribs; and drying the applied mixture at a certain temperature. The ability to retain water in the water-retaining layer per unit active area of the electrodes is desirably in the range of 0.002 to 0.035 g/cm$^2$, and more desirably, in the range of 0.01 to 0.03 g/cm$^2$.

22 Claims, 8 Drawing Sheets

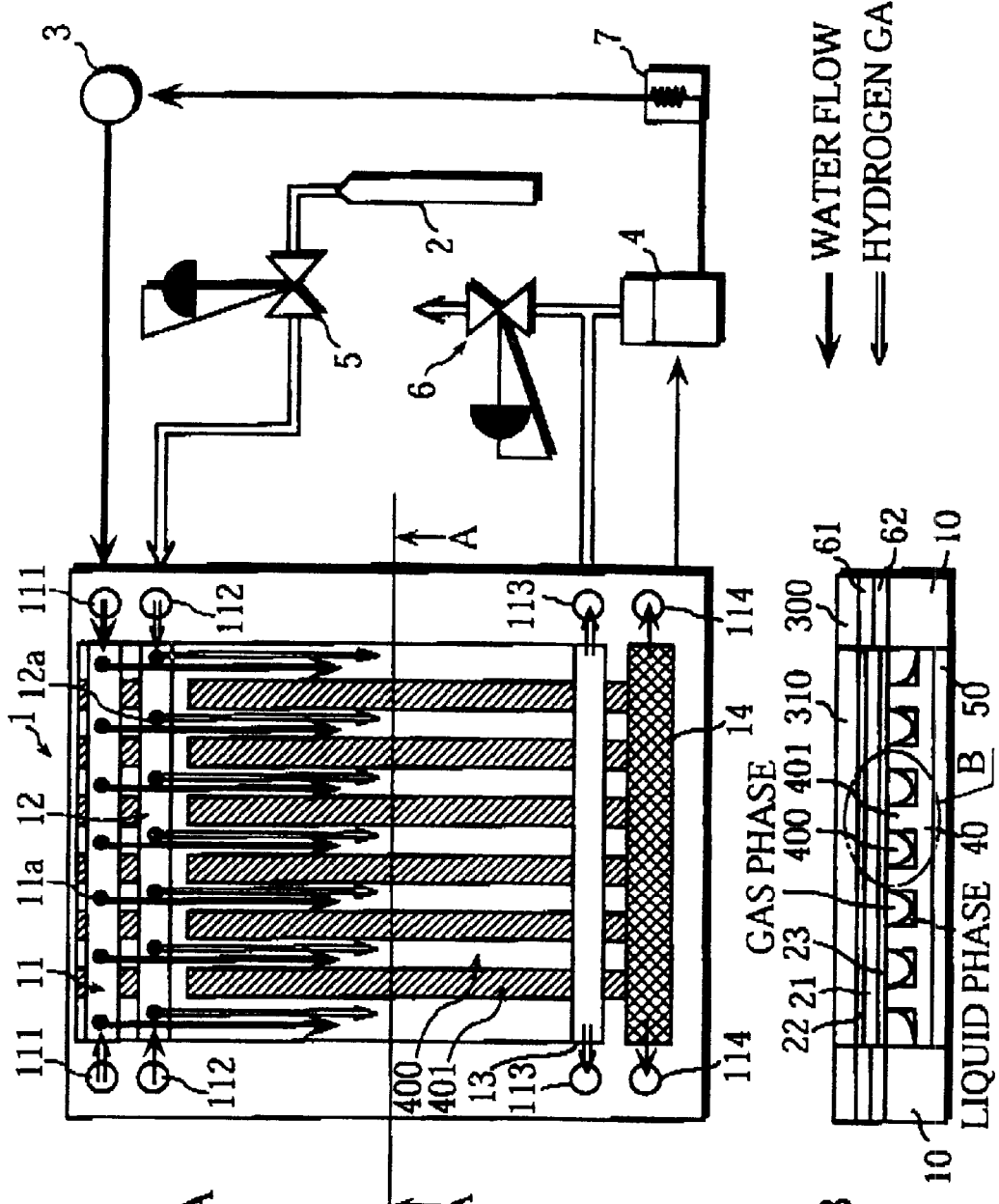

POLYMER ELECTROLYTE FUEL CELL INCLUDING A WATER-RETAINING LAYER ON A RIBBED PLATE

BACKGROUND OF THE INVENTION (1) Field of the Invention

The present invention relates to a polymer electrolyte fuel cell. More particularly, the present invention relates to a polymer electrolyte fuel cell which is operated while a humidifying agent is supplied to a polymer electrolyte membrane together with either or both of a fuel gas and an oxidant.

(2) Description of the Prior Art

Many of commercially practical polymer electrolyte fuel cells are a stack of a plurality of cell units each of which includes a cell sandwiched by a pair of ribbed plates each having a plurality of parallel ribs with a certain pitch on a surface, where the cell is composed of an anode, a cathode, and a polymer electrolyte membrane, the polymer electrolyte membrane being disposed between the anode and the cathode.

Spaces formed between each adjacent ribs and the cathode or anode are used as channels. During operation of the polymer electrolyte fuel cell, anode-side channels are supplied with a fuel gas (e.g., hydrogen) and cathode-side channels are supplied with air ($O_2$) as oxidant. During such an operation, hydrogen decomposes into hydrogen ions ($H^+$) and electrons ($e^-$) at the anode. The hydrogen ions ($H^+$) pass through the polymer electrolyte membrane, an electrolyte, to reach the cathode. The electrons ($e^-$) flow out to an external circuit. At the cathode, water ($H_2O$) is generated by reaction between the oxygen ($O_2$), the hydrogen ions ($H^+$) coming from the anode, and the electrons ($e^-$) coming from the anode via the external circuit. This provides electric energy.

As described above, the hydrogen ions ($H^+$) pass through the polymer electrolyte membrane to reach the cathode. This is possible because the polymer electrolyte membrane has a property to selectively pass (diffuse) hydrogen ions in hydration ($H+(XH_2O)$). Therefore, conventional methods have been used to humidify the polymer electrolyte membrane. Among such methods are: a method in which a fuel gas having been humidified is supplied so as to humidify the polymer electrolyte membrane; and a method in which a fuel gas and water separately supplied to the anode-side channels flow together through the channels so that the fuel gas is effectively supplied to the anode, the polymer electrolyte membrane is effectively humidified, and the cell is cooled.

Meanwhile, as the polymer electrolyte membrane becomes dry, the ion permeability of the membrane decreases, increasing internal resistance and reducing the electric power generation efficiency.

Accordingly, to make full use of the electric power generation capability, the polymer electrolyte membrane needs to be humidified in its entirety. That is to say, of the polymer electrolyte membrane, not only a part facing the channels, but a part facing highest ends of the ribbed plate should sufficiently be humidified.

Conventionally, the ribbed plate is made of a carbon porous material. With this construction, water permeates into the ribbed plate sufficiently since the ribbed plate is porous. That is, the polymer electrolyte membrane is humidified in its entirety, and the part facing highest ends of the ribbed plate is also sufficiently humidified.

However, a typical method for manufacturing the ribbed plate has low manufacturability, resulting in a high manufacturing cost. Typically, the ribbed plate is manufactured with the following procedure. manufacture paper from carbon fiber chips; harden the paper with phenol resin to manufacture sheets of paper; stack the sheets of pater and bake the stack to obtain a plate made of a carbon porous material; and cut the plate to each piece of the ribbed plate.

As a method with which the manufacturability can be increased, a method in which the ribbed plate is formed from a mixture of carbon and resin using a mold is currently considered. However, molded products have dense construction. With such construction, the surface of molded ribbed plates becomes water-repellent, and a part of the polymer electrolyte membrane facing highest ends of the ribbed plate is not sufficiently humidified.

SUMMARY OF THE INVENTION

It is therefore the first object of the present invention to provide a polymer electrolyte fuel cell for practical use in which the polymer electrolyte membrane is maintained to be humidified entirely even if a dense material is used for the ribbed plate.

It is the second object of the present invention to provide a polymer electrolyte fuel cell in which the polymer electrolyte membrane is sufficiently humidified, channels formed between the ribbed plate and electrodes are not easily blocked by water, and diffusion of gas flowing through the channels into the electrolyte membrane is secured.

It is the third object of the present invention to provide a polymer electrolyte fuel cell which can be manufactured at a low cost.

It is the fourth object of the present invention to provide a polymer electrolyte fuel cell which includes a ribbed plate which: has high precision in shape; and is manufactured using a mold from a material having electric conductivity required for the cell performance.

The first object of the present invention is fulfilled by a polymer electrolyte fuel cell comprising: a cell including an electrolyte membrane and two electrodes which are disposed on two surfaces of the electrolyte membrane; a first ribbed plate having a plurality of ribs on a surface facing one of the two electrodes of the cell; and a second ribbed plate having a plurality of ribs on a surface facing the other of the two electrodes, where a water-retaining layer having a certain range of ability to retain water is formed to coat one or more tops of the plurality of ribs of at least one of the first ribbed plate and the second ribbed plate.

The second object of the present invention is fulfilled by the above polymer electrolyte fuel cell in which the water-retaining layer has ability to retain water per unit active area of the two electrodes in a range of 0.002 $g/cm^2$ to 0.035 $g/cm^2$, or a range of 0.01 $g/cm^2$ to 0.03 $g/cm^2$.

The third object of the present invention is fulfilled by the above polymer electrolyte fuel cell in which the ribbed plate with the water-retaining layer is formed using a mold from a resin-carbon mixture without baking or is formed from a metal.

The fourth object of the present invention is fulfilled by the above polymer electrolyte fuel cell in which the ribbed plate coated with the water-retaining layer is formed from a resin-carbon mixture without adding heat using a mold, and ratio of resin to carbon in this resin-carbon mixture is 10% to 20% by weight on a percentage basis.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 4A and 4B are show operation of the polymer electrolyte fuel cell of the embodiment;

DESCRIPTION OF THE PREFERRED EMBODIMENTS

Figure 1:
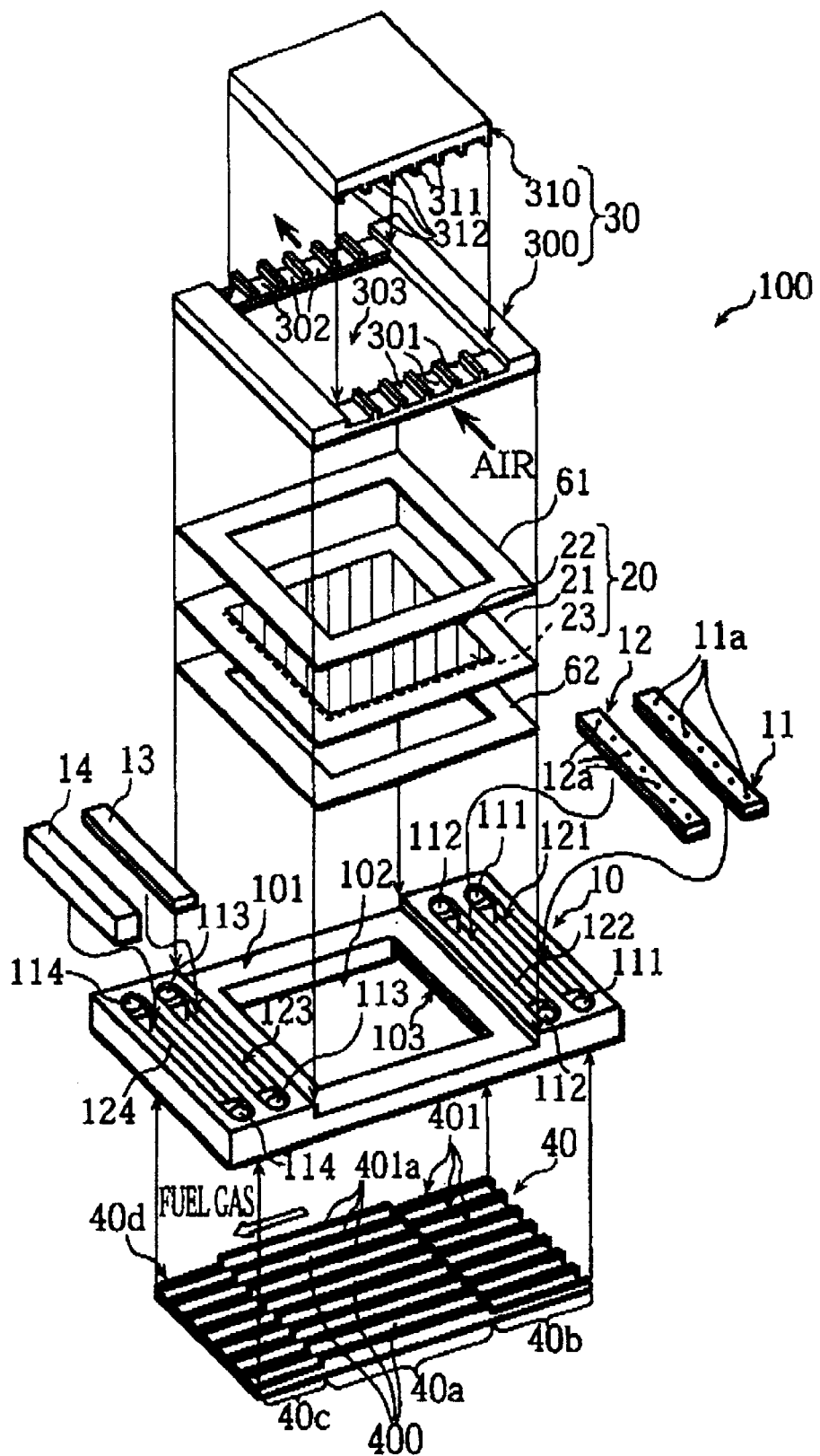
FIG. 1 is an assembly drawing of a cell unit which is a basic component of the polymer electrolyte fuel cell of the embodiment.

FIG. 1 is an assembly drawing of a cell unit 100 which is a basic component of a polymer electrolyte fuel cell 1 (hereinafter referred to as fuel cell 1) of the present embodiment.

As shown in FIG. 1, the cell unit 100 is mainly composed of a frame 10, a cell 20, a channel substrate 30, and an anode-side ribbed plate 40. The cell 20 and the channel substrate 30 are fitted in one side (upside, in FIG. 1) of the frame 10, and the anode-side ribbed plate 40 is fitted in the other side (downside, in FIG. 1) of the frame 10. The cell 20 is composed of a polymer electrolyte membrane 21, a cathode 22, and an anode 23, the polymer electrolyte membrane 21 being sandwiched by the cathode 22 and the anode 23. The channel substrate 30 includes a cathode-side ribbed plate 310 having a plurality of ribs 311 in parallel on a surface. The anode-side ribbed plate 40 has a plurality of ribs in parallel on a surface. Note that in FIG. 1, the anode 23 is drawn with a short dashed line since the anode 23 is on the back side of the polymer electrolyte membrane 21.

The cell 20 is sandwiched between the channel substrate 30 and the anode-side ribbed plate 40 with pressure from them. Cathode-side channels 312 are each a space formed between each adjacent ribs 311 and the cathode 22. Anode-side channels 400 are each a space formed between each adjacent ribs 401 and the anode 23. The air flows through the cathode-side channels 312 in the direction indicated by the thick arrows shown in FIG. 1. Fuel gas flows through the anode-side channels 400 in the direction indicated by the hollow arrows shown in FIG. 1. Electricity is generated in the cell 20.

The fuel gas may be a hydrogen gas or a gas formed by reforming natural gas, propane, butane, or methanol and whose main component is hydrogen.

The frame 10 includes a rectangular plate. In the center of one side (upside, in FIG. 1) of the rectangular plate, a cut 101 is formed so that the cell 20 and the channel substrate 30 are fitted in the cut 101. On the other side (downside, in FIG. 1) of the rectangular plate, a pit 103 is formed so that the anode-side ribbed plate 40 is fitted in the pit 103. A hole referred to as window 102 is opened at the center of the cut 101 to allow the anode 23 to contact the anode-side ribbed plate 40. The frame 10 is formed by molding plastic material with the injection molding method.

On one edge of the frame 10 upstream of the fuel gas flow; a pair of manifolds 111 and a slot 121 are formed to supply water, the water being used for humidifying the polymer electrolyte membrane and hereinafter referred to as humidifying water; and a pair of manifolds 112 and a slot 122 are formed to supply the fuel gas. In the upstream area, a water distribution plate 11 is fitted in the slot 121 with a packing (not illustrated) in between, and a gas distribution plate 12 is fitted in the slot 122 with a packing (not illustrated) in between, where the water distribution plate 11 and gas distribution plate 12 are wider than the slots 121 and 122, respectively. In the water distribution plate 11 and the gas distribution plate 12, a plurality of pores 11a and a plurality of pores 11b each corresponding to the anode-side channels 400 are opened, respectively. With this construction: the humidifying water supplied through the manifolds 111 is distributed to each anode-side channel 400 via the plurality of pores 11a; and the fuel gas supplied through the manifolds 112 is distributed to each anode-side channel 400 via the plurality of pores 11b.

On the other edge of the frame 10 downstream of the fuel gas flow: a pair of manifolds 113 and a slot 123 are formed to vent unreacted gas; and a pair of manifolds 114 and a slot 124 are formed to vent the humidifying water. In the downstream area: a gas-permeable plate 13 is fitted in the slot 123, the gas-permeable plate 13 being made of a known material, such as water-repellent carbon paper, that selectively exhausts gas from the anode-side channels 400; and a water-absorption material 14 is fitted in the slot 124, the water-absorption material 14 being made of a known material, such as polyester felt, that promptly sucks the water sent through the anode-side channels 400, and preserves the water equally for each channel, and smoothly emits the water. With this construction: the unreacted fuel gas runs through the anode-side channels 400 and reaches the gas-permeable plate 13 to be further supplied through the pair of manifolds 113; and the humidifying water runs through the anode-side channels 400 and reaches the water-absorption material 14 to be further supplied through the pair of manifolds 114.

The channel substrate 30 is composed of a frame 300 and a channel plate 310, where the channel plate 310 is fitted in the frame 300. The frame 300 is a rectangular plate made of plastic, a window 303 being opened at the center thereof. Channels 301 and channels 302 are formed on a surface (upside in FIG. 1) of the frame 300 with the cathode 22 at its back, where the channels 301 are used to lead air to the channels 312, and the channels 302 are used to release air from the channels 312.

A gasket 61 is formed between the channel substrate 30 and the cell 20; a gasket 62 is formed between the cell 20 and the cut 101.

The anode-side ribbed plate 40, on which a plurality of ribs 401 are formed in parallel, is rectangular and slightly smaller than the frame 10.

The anode-side ribbed plate 40 is composed of a center part 40a, an upstream part 40b, and a downstream part 40c, where the locations are referred to in terms of the fuel gas flow. The ribs of the center part 40a are higher than the upstream part 40b and the downstream part 40c. The highest ends 401a of the center part 40a fit in the window 102 so that the center part 40a electrically contact the anode 23.

The polymer electrolyte membrane 21 is a thin membrane made of perfluorocarbon sulfonic acid. The cathode 22 and the anode 23 are layers made of carbon supported platinum and have a certain thickness. The cathode 22 and the anode 23 are bonded to both sides of the polymer electrolyte membrane 21 at the center with the hot press method.

The ribbed plates 40 and 310 are manufactured from mixed material of thermosetting resin and carbon with the compression molding method. In the present embodiment, phenol resin, which is relatively less expensive than other resins, is used as the thermosetting resin. The carbon is used to give conductivity to the ribbed plates, and may be; one of graphite, expanded graphite (e.g., CARBOFIT made by Hitachi Chemical Co., Ltd.), and carbon black; a mixture of all of the three types; or a mixture of two types arbitrarily selected from the three.

It is desirable that the ratio of resin to carbon is 5 to 40% by weight on a percentage basis, more preferably 10 to 20%. This is because: with the ratio of resin to carbon less than 5% by weight on a percentage basis, the molded material tends to chip or generate cavity during the molding process, resulting in lack of precision in shape; and with the ratio of resin to carbon more than 40% by weight on a percentage basis, the electric conductivity decreases, resulting in reduction in cell performance. In reality, with the above problems in manufacturing or using the fuel cell taken into consideration, it is thought to be best to manufacture the ribbed plates with the ratio of resin to carbon 10 to 20% by weight on a percentage basis. In the present example, carbon black is used as carbon, and the ratio of resin to carbon is 17.6% on a percentage basis, where the mixture contains 15% by weight of phenol resin and 85% by weight of carbon black.

Figure 2:
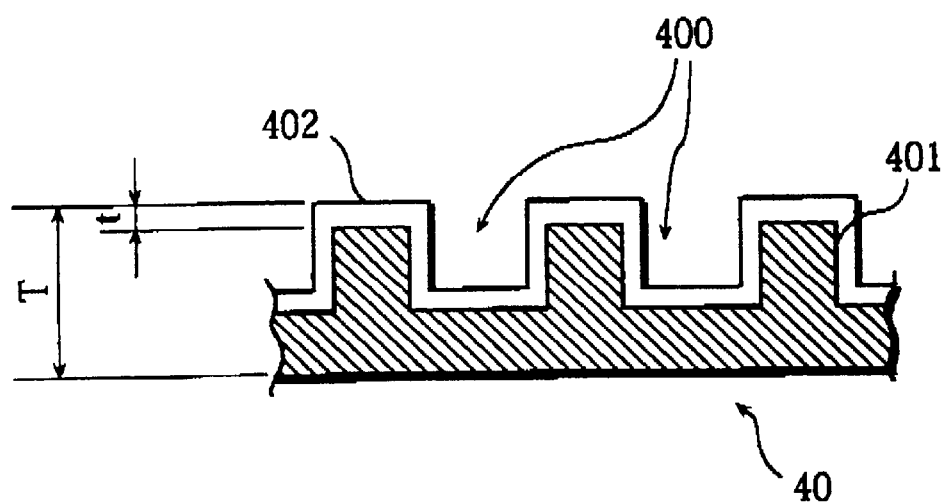
FIG. 2 is a sectional view of the anode-side ribbed plate of the cell unit shown in FIG. 1.

As shown in FIG. 2, a water-retaining layer 402 is formed on the surface of the ribbed plate 40, covering the surface of the ribs 401 between which channels 400 are formed to convey humidifying water. FIG. 2 is a sectional view of the ribbed plate 40 taken perpendicular to the direction of the length. The drawing slightly exaggerates the thickness of the water-retaining layer 402. In reality, the thickness T of the ribbed plate 40 is several millimeters, while the thickness t of the water-retaining layer 402 is several micrometers to several hundreds of micrometers.

As described earlier, the ribbed plates 40 and 310 are manufactured with the compression molding method. This contributes to reduction in overall cost of the fuel cell since the method has high manufacturability. However, this method causes loss of porousness of carbon and generates dense products since in this method, the material is poured into mold, heated, pressed, and shaped. The molded ribbed plates 40 and 310 are water-repellant. As a result, to secure the water-retaining capability and gas-permeability, the ribbed plate 40 is coated by the water-retaining layer 402.

It should be noted here that though in the present embodiment, the ribbed plates 40 and 310 are manufactured with the compression molding method using a thermosetting resin, a thermoplastic resin or the injection molding method may be used instead, where the injection molding method has higher manufacturability than the compression molding method.

The water-retaining layer 402 is made of a mixture of resin and carbon (hereinafter referred to as a resin-carbon mixture). The resin-carbon mixture is dissolved into a solvent such as alcohol, and applied to the surface of the ribbed plate 40 using a spray. The applied material is then dried at 200° C. for approximately an hour to stick thereto. As described above, the water-retaining layer 402 of the present embodiment is solidified only by drying the resin-carbon mixture (without pressurizing). Therefore, the water-retaining layer 402 maintains the porousness of carbon and is a porous layer having the property of absorbing water.

The ratio of resin to carbon on a percentage basis and the carbon type in the resin-carbon mixture of the water-retaining layer 402 are set in the same ranges as the ribbed plates 40 and 310 for the same reason as described earlier. Furthermore, by adopting a ratio of resin to carbon and a carbon type that are identical or close to those of the ribbed plates 40, the water-retaining layer 402 tends to conform to the ribbed plate 40 and sticks to the ribbed plate 40 with more strength. In the present example, the ratio of resin to carbon in the resin-carbon mixture is 17.6% on a percentage basis which is equal to that in the ribbed plates 40 and 310, with the mixture containing 15% by weight of phenol resin and 85% by weight of carbon black.

Figure 3:
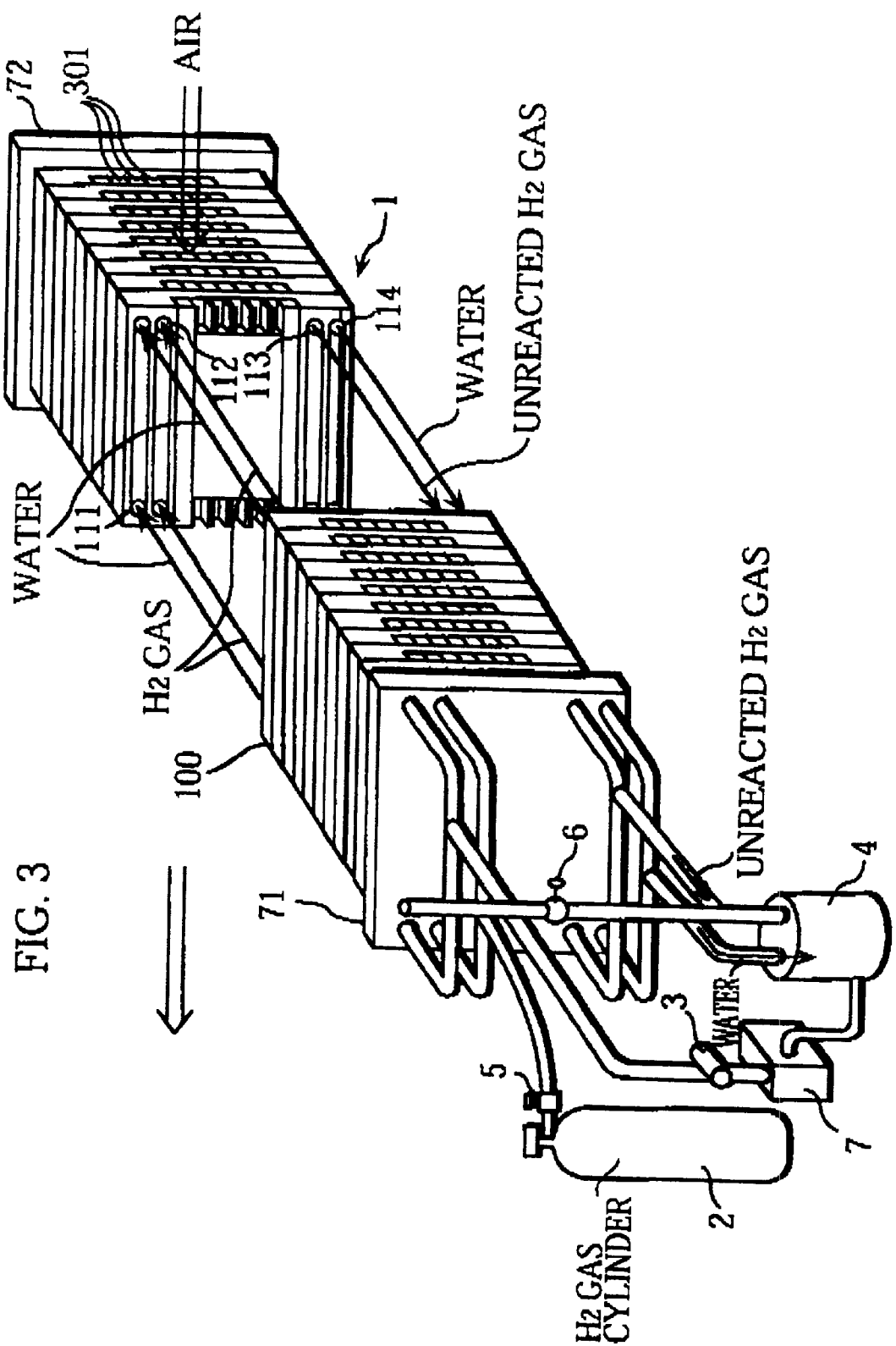
FIG. 3 is a perspective diagram showing the entire construction and operation of the polymer electrolyte fuel cell of the embodiment.

As shown in FIG. 3, the fuel cell 1 includes a stack of a certain number (in the present example, 65) of cell units 100, the stack being sandwiched by end plates 71 and 72. In this construction, each sequence of the manifolds 111, 112, 113, and 114 in the fuel cell 1 form one communicating tube, referred to as internal manifold.

The fuel cell 1 is positioned so that air laterally flows through the air channels (cathode-side channels 312) during operation. A fan (not illustrated) is used to send air to the channels 301. The air flows through the cathode-side channels 312 providing oxygen to the cathode 22, and is exhausted from the channels 302.

The humidifying water is supplied at a certain water pressure from a pump 3 to an internal manifold consisting of the manifolds 111. Hydrogen gas is supplied to the inner manifold consisting of the manifolds 112 from a hydrogen gas cylinder 2, where the hydrogen gas is regulated to a certain pressure by a regulator 5 before it is supplied to the internal manifold.

The supplied humidifying water and hydrogen gas are distributed to the certain number of cell units 100, and, as shown in FIGS. 4A and 4B, are supplied to the anode-side channels 400 via the water distribution plate 11 and the gas distribution plate 12. FIG. 4A is a sectional view of the assembled cell units 100 taken in the direction of the length of the ribs 401 so that the highest ends 401a of the ribs 401 can be included in the view. FIG. 4B is a sectional view taken substantially along line A—A of FIG. 4A.

A part of the supplied humidifying water humidifies the polymer electrolyte membrane 21; the rest passes through the slot 124, the water-absorption material 14, and the internal manifold consisting of manifolds 114, then are emitted outside from the cell. The hydrogen gas passes through the anode-side channels 400, generating electricity; and the unreacted hydrogen gas which has not been used for the electricity generation, as described earlier, passes through the slot 123, the gas-permeable plate 13, and the internal manifold consisting of manifolds 113, then are exhausted outside from the cell. Note that the internal manifold consisting of manifolds 113 emits a small amount of vapor together with the hydrogen gas.

As shown in FIG. 3, the humidifying water emitted from the fuel cell 1 and the water condensed from the vapor contained in the exhausted gas are collected by the separation tank 4. The collected water is cooled in the cooler 7 and is supplied again to the fuel cell 1 through the water pump 3. The pressure for exhausting the unreacted hydrogen gas is adjusted by the regulator 6 so that the fuel utilization in the fuel cell 1 is a certain value. The hydrogen gas is exhausted while it is separated from the liquid water. As a result, it is also possible to recycle the exhausted hydrogen gas without allowing it to pass through the separation tank 4.

Figure 5A:
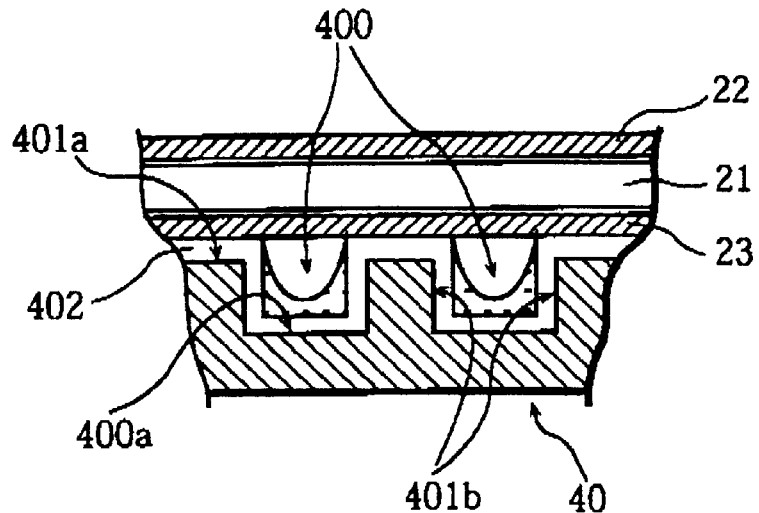
FIG. 5A is a sectional view of the anode-side ribbed plate in operation.

FIG. 5A is an expansion of the part B shown in FIG. 4B. Flow of the humidifying water leans on the side of the channel bottom 400a since the surface of the anode 23 is water-repellant. Vapor generated from the humidifying water currently flowing or from the humidifying water retained in the rib sides 401b or channel bottom 400a permeates through the anode 23 facing the channels 400 and humidifies the polymer electrolyte membrane 21. The humidifying water further permeates through the water-retaining layer 402 formed on the surface of the ribbed plate 40, and extends into the highest ends 401a of the ribs 401. Also, the vapor generated from the water-retaining layer 402 of the highest ends 401a permeates through the anode 23 and humidifies the polymer electrolyte membrane 21. That is to say, the polymer electrolyte membrane 21 is humidified not only in the part facing the channels 400 but in the part facing the ribs 401. As a result, the whole part of the polymer electrolyte membrane 21 is humidified.

Figure 5B:
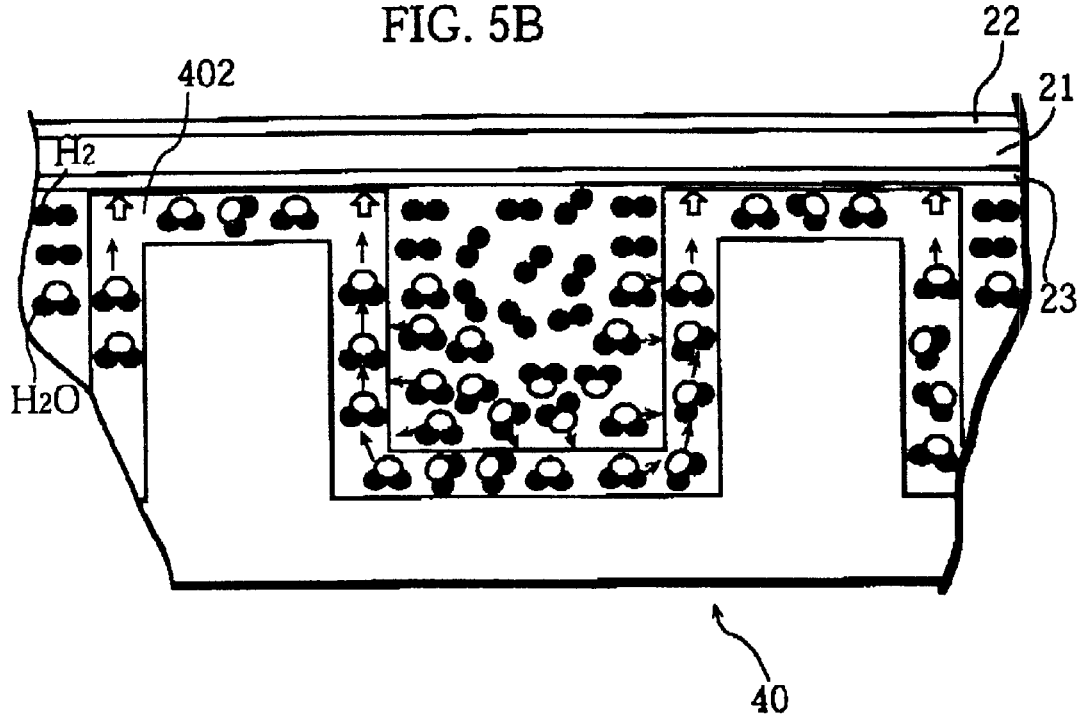
FIG. 5B shows mainly water flow around the anode-side ribbed plate in operation.

In the present embodiment, the water-retaining layer is formed to cover the whole surface of one side of the ribbed plate 40 on which the ribs 401 are formed. However, the water-retaining layer may be formed to cover one of; (a) only the highest ends 401a; (b) the highest ends 401a and rib sides 401b; and (c) the highest ends 401a and channel bottom 400a. That is to say, the above effects of the present invention can be obtained when the water-retaining layer covers at least the highest ends 401a. However, as the area covered by the water-retaining layer extends to the rib sides 401b and further to the channel bottom 400a as in the present embodiment, the amount of water absorbed by the water-retaining layer increases as shown in FIG. 5B, and the amount of water supplied to the water-retaining layer covering the highest ends 401a increases.

The inventors of the present invention have found that the amount of water that can be retained by the water-retaining layer affects the effects of the present invention. The amount should not be in excess or lack of a certain range. The inventors detected the proper range of the amount of water to be retained by the water-retaining layer by executing Experiment 1 described as follows.

Experiment 1

The ability to retain water is expressed by unit $g/cm^2$ representing the amount of water retained per unit active area of the electrode (in the present example, per unit active area of the anode 23). The ability to retain water is measured in the following procedure.

① The anode-side ribbed plate on which the water-retaining layer is formed is soaked in ion exchange water at 80° C. for approximately an hour.

② The surface of the anode-side ribbed plate having been soaked in ① above is lightly wiped away with a non-woven fabric (KIMTOWELS® made by CRECIA Corporation), then the weight of the ribbed plate is measured.

③ The anode-side ribbed plate is dried in a constant temperature bath set to 80° C. for approximately an hour, then the weight of the ribbed plate is measured.

④ The difference between the weights obtained in ② and ③ above i divided by the active area of the electrode (in the present example, 100 $cm^2$), resulting in the target ability to retain water[$g/cm^2$].

Experiment 1 was conducted to obtain a plot of cell voltage vs. ability to retain water under operation Conditions (1) shown below by varying the thickness of the water-retaining layer to vary the ability to retain water. Note that in Experiment 1: a reforming apparatus is used instead of the hydrogen gas cylinder 2 shown in FIG. 3; and a hydrogen-rich reformed gas is supplied as the fuel gas.

Operation Conditions (1)

current density: $0.4A/cm^2$ fuel gas: 80% $H_2$/20% $CO_2$ hydrogen utilization: 70% oxidant utilization; 20% cell temperature (center): 80° C.

Figure 6:
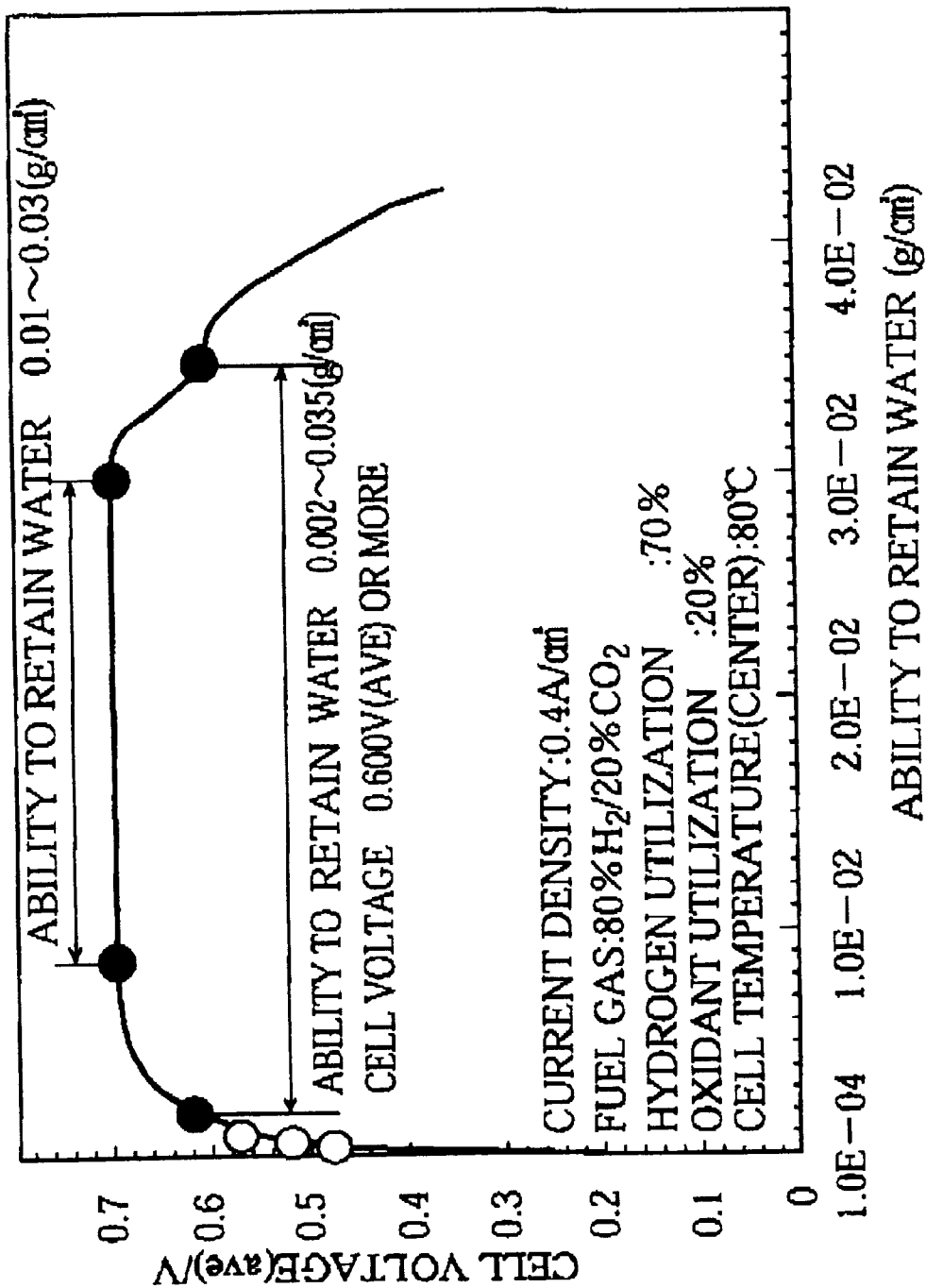
FIG. 6 is a plot of the results of Experiment 1.

FIG. 6 shows a plot of cell voltage vs. ability to retain water obtained from Experiment 1 above. The plot shows that the cell voltage becomes lower than 0.6[V], which is a minimum voltage typically required for a fuel cell, when the ability to retain water is outside the range of 0.002 to 0.035[$g/cm^2$]. This is considered to be because; it is difficult for water to permeate into a contacting part between the highest ends and the electrodes and the polymer electrolyte membrane is not humidified in its entirety when the ability to retain water is lower than 0.002[$g/cm^2$]; while the surface of the electrodes facing the channels tends to wet entirely or the channels tend to be blocked by water when the ability to retain water is higher than 0.035[$g/cm^2$], which reduces the gas diffusion to cause partial gas depletion. The plot also shows that the cell voltage is stabilized at approximately 0.7[V] when the ability to retain water is in the range of 0.01 to 0.03[$g/cm^2$]. It is understood from the above experiment results that the ability to retain water is desirably in the range of 0.002 to 0.035[$g/cm^2$], and more desirably, in the range of 0.01 to 0.03[$g/cm^2$]. In the present experiment, the thickness of the water-retaining layer ranging from 10 $\mu$m to 100 $\mu$m corresponds to the ability to retain water ranging from 0.002 to 0.035[$g/cm^2$]; the thickness of the water-retaining layer ranging from 5 $\mu$m to 200 $\mu$m corresponds to the ability to retain water ranging from 0.01 to 0.03[$g/cm^2$].

The ability of the water-retaining layer to retain water can also be adjusted by other methods such as; changing the carbon type; changing hole-opening agent type or changing the ratio of the hole-opening agent contained in the resin-carbon mixture; or changing the area of the ribbed plate on which the water-retaining layer is formed. Although specific data for each of the above methods is not shown here, these methods can be used to obtain substantially the same effects as the present method of changing the thickness of the water-retaining layer.

The fuel cell used in Experiment 1 is referred to as Fuel Cell 1. A fuel cell which does not contain the water-retaining layer was manufactured as a sample to be compared with Fuel Cell 1. The sample fuel cell is referred to as Comparative Cells. Table 1 below shows the specifications of Fuel Cell 1 and Comparative Cell.

TABLE 1

| CELL SPECIFICATION | FUEL CELL 1 | COMPARATIVE CELL |
|---|---|---|
| ACTIVE AREA OF ELECTRODE | 100 $cm^2$ | SAME AS LEFT |
| ELECTROLYTE MEMBRANE | PERFLUOROCARBON SULFONIC ACID | SAME AS LEFT |
| ANODE | CARBON SUPPORTED PLATINUM | SAME AS LEFT |
| CATHODE | CARBON SUPPORTED PLATINUM | SAME AS LEFT |

TABLE 1-continued

| CELL SPECIFICATION | FUEL CELL 1 | COMPARATIVE CELL |
|---|---|---|
| RIBBED PLATE | COMPRESSION-MOLDED PLATE (85% BY WT. OF CARBON BLACK, 15% BY WT. OF PHENOL RESIN) | SAME AS LEFT |
| WATER-RETAINING LAYER ON ANODE-SIDE RIBBED PLATE | COMPOSITION: 85% BY WT. OF CARBON BLACK, 15% BY WT. OF PHENOL RESIN. ABILITY TO RETAIN WATER: 0.025 g/cm$^2$. (THICKNESS: 20 μm ± 5 μm) | NONE |

As apparent from Table 1, the only difference between the two types of fuel cells is whether the water-retaining layer is formed or not.

Experiment 2

Experiment 2 was conducted to obtain a plot of cell voltage vs. current density under Operation Conditions (2) shown below.

Operation Conditions (2)
  fuel gas: $H_2$
  oxidant: air
  hydrogen utilization: 70%
  oxidant utilization: 20%
  cell temperature (center): approx. 70° C.

Figure 7:
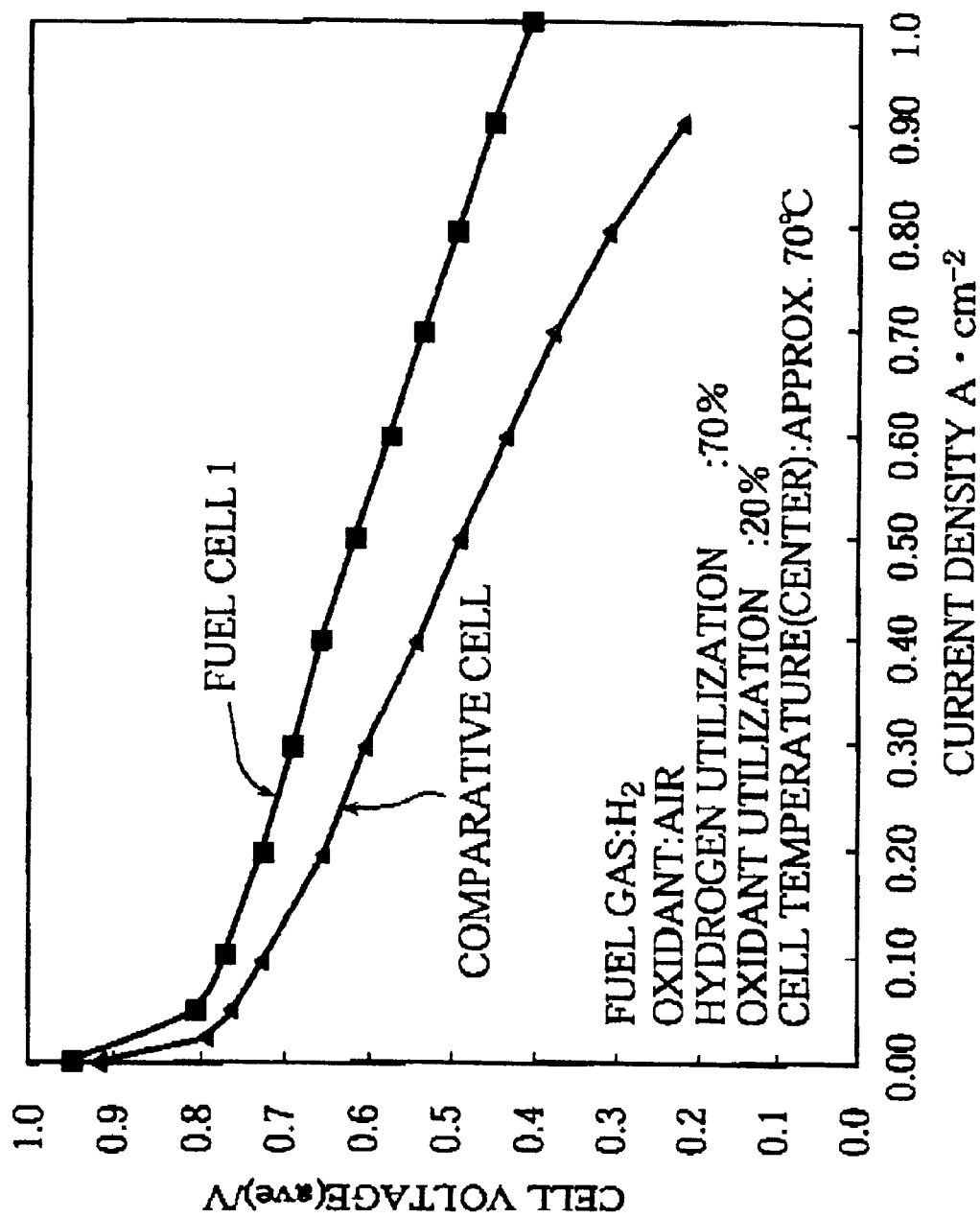
FIG. 7 is a plot of the results of Experiment 2.

FIG. 7 shows a plot of cell voltage vs. current density obtained from Experiment 2 above. The plot shows that the cell voltage decreases as the current density increases in both Fuel Cell 1 and Comparative Cell. However, the ratio of call voltage reduction of Fuel Cell 1 is smaller than Comparative Cell. This is considered to be because in Comparative Cell, the polymer electrolyte membrane is not humidified in its entirety due to the lack of the water-retaining layer, resulting in: reduction in the ion permeability; and increase in internal resistance as much.

Experiment 3

Experiment 3 was conducted to obtain changes in average cell voltage over time under Operation Conditions (3) shown below.

Operation Conditions (3)
  current density: 0.4A/cm$^2$
  fuel gas: $H_2$
  hydrogen utilization; 70%
  oxidant utilization: 20%
  cell temperature (center); approx. 70° C.

Figure 8:
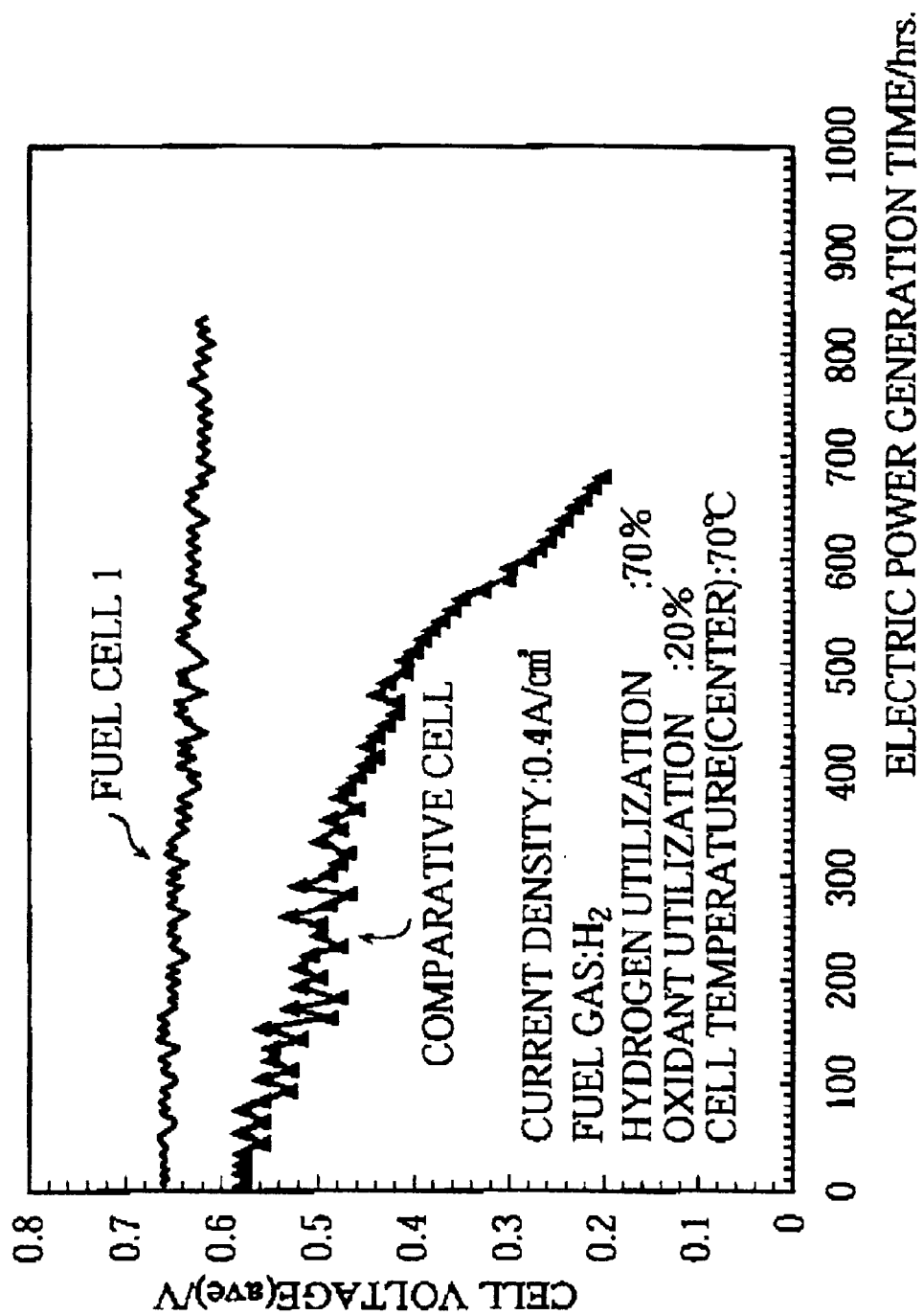
FIG. 8 is a plot of the results of Experiment 3.

FIG. 8 shows a plot of average cell voltage vs. electric power generation time obtained from Experiment 3 above. The plot shows that: the cell voltage of Fuel Cell 1 does not substantially change over time during electric power generation: while the cell voltage of Comparative Cell decreases in the same condition. This is considered to be because: in Comparative Cell, water flowing through the water-flow channels (corresponding to the channels 400 in Fuel Cell 1, see FIG. 5A) tends to become ball-like to block the channels and reduce the gas diffusion since the surface of the water-flow channels is water-repellant; and once a blockage of channel by water is created, it is not easily destroyed, the number of such blockages increases with time and the number of parts with gas depletion increases. On the other hand, the surface of the channels of Fuel Cell 1 is coated with the water-retaining layer. As a result, in Fuel Cell 1, the flowing water does not become ball-like and the channels are not blocked by water.

Up to this point, the polymer electrolyte fuel cell of the present invention has been explained. It is needless to say that the present invention is not limited to the above embodiment. Various modification examples for the present invention will be provided below.

(1) In the above embodiment, water as a humidifying agent is supplied to the anode-side channels. However, the fuel gas having been humidified by a humidifier may be supplied instead.

(2) In the above embodiment, a humidifying agent is supplied only to the anode-side channels. However, the humidifying agent may be supplied only to the cathode-side channels, or to both anode-side and cathode-side channels. Note that in either case, the water-retaining layer should be formed on the surface of ribbed plates on which channels for transferring humidifying agent are provided.

It is also possible to form the water-retaining layer as well on ribbed plates to which humidifying agent is not supplied. That is to say, in the above embodiment, the water-retaining layer may be formed on the cathode-side ribbed plate. With this arrangement, the water generated in the cathode side is retained in the water-retaining layer. This allows the polymer electrolyte membrane to be more humidified, further improving the cell performance. Note that the conditions, such as the area of the water-retaining layer to be formed and the ability to retain water, required for the water-retaining layer formed on the cathode-side ribbed plate are the same as those for the water-retaining layer formed on the anode-side ribbed plate which have been described earlier.

(3) In the above embodiment, ribs are formed on one side of a plate. However, ribs may be formed on both sides of a plate. That is to say, the fuel cell may use a one-piece ribbed plate which is provided with a cathode-side ribbed plate and an anode-side ribbed plate.

(4) In the above embodiment, the ribbed plates are manufactured from mixed material of thermosetting resin and carbon. However, the ribbed plates may be manufactured from metals with the extrusion method or the die casting method.

(5) In the above embodiment, in formation of the water-retaining layer, the resin-carbon mixture is dissolved into a solvent such as alcohol, and applied to the surface of the ribbed plate using a spray. However, the resin-carbon mixture solvent may be applied using a brush or knife, or with the screen printing method.

(6) In the above embodiment, the water-retaining layer is made from the resin-carbon mixture. However, to increase the porousness of the water-retaining layer, a hole-opening agent may be used. Two methods for using a hole-opening agent will be provided below.

① The resin-carbon mixture is dissolved into a solvent such as alcohol. A hole-opening agent being a powdery transition metal such as zinc, lead, iron, copper, or nickel or a powdery calcium carbonate is mixed with the resin-carbon mixture solvent. This mixture is applied to the surface of the ribbed plate, then dried. The ribbed plate is soaked in hydrochloric acid, nitric acid, or sulfuric acid so that the hole-opening agent is dissolved into the acid, leaving holes. The ribbed plate is then dried. With this procedure, the porousness of the water-retaining layer is increased.

The resin-carbon mixture is dissolved into a solvent such as alcohol. A hole-opening agent being a powdery ammonium hydrogencarbonate is mixed with kerosene, and then filtered. Paste resulting from the filtration is applied to the surface of the ribbed plate. The ribbed plate is then first dried at a low temperature as a preliminary drying process. The ribbed plate is then dried at 200° C. as a full-scale drying process. The ammonium hydrogencarbonate volatilizes through this procedure, leaving holes. With this procedure, the porousness of the water-retaining layer is increased. It should be noted here that the full-scale drying process of 200° C. is performed to volatilize alcohol completely and remove as much alcohol as possible from the water-retaining layer. To volatilize the ammonium hydrogencarbonate, it is enough to dry at around 80° C.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A polymer electrolyte fuel cell comprising;
   a cell including an electrolyte membrane and two electrodes which are disposed on two surfaces of the electrolyte membrane;
   a first ribbed plate having a plurality of ribs on a surface facing one of the two electrodes of the cell; and
   a second ribbed plate having a plurality of ribs on a surface facing the other of the two electrodes, wherein
   a water-retaining layer is formed to coat one or more tops of the plurality of ribs of at least one of the first ribbed plate and the second ribbed plate, the water-retaining layer having ability to retain water per unit active area of the two electrodes in a range of 0.002 g/cm$^2$ to 0.035 g/cm$^2$, the water-retaining layer being in contact with at least one of the two electrodes.

2. The polymer electrolyte fuel cell of claim 1, wherein
   the water-retaining layer is a porous layer made of a resin-carbon mixture, and
   ratio of resin to carbon in the resin-carbon mixture is 5% to 40% by weight on a percentage basis.

3. The polymer electrolyte fuel cell of claim 2, wherein
   the ribbed plate coated with the water-retaining layer is formed using a mold from a resin-carbon mixture without baking.

4. The polymer electrolyte fuel cell of claim 3, wherein
   the carbon comprises a material selected from the group consisting of graphite, expanded graphite, carbon black, and mixtures of two or more thereof.

5. The polymer electrolyte fuel cell of claim 1, wherein
   the water-retaining layer is a porous layer made of a resin-carbon mixture, and
   ratio of resin to carbon in the resin-carbon mixture is 10% to 20% by weight on a percentage basis.

6. The polymer electrolyte fuel cell of claim 5, wherein
   the ribbed plate coated with the water-retaining layer is formed using a mold from a resin-carbon mixture without baking.

7. The polymer electrolyte fuel cell of claim 6, wherein
   the carbon comprises a material selected from the group consisting of graphite, expanded graphite, carbon black, and mixtures of two or more thereof.

8. The polymer electrolyte fuel cell of claim 5, wherein
   the ribbed plate coated with the water-retaining layer is formed using a mold from a resin-carbon mixture without baking, and
   a ratio of resin to carbon in the resin-carbon mixture is 10% to 20% by weight on a percentage basis.

9. The polymer electrolyte fuel cell of claim 8, wherein
   the carbon comprises a material selected from the group consisting of graphite, expanded graphite, carbon black, and mixtures of two or more thereof.

10. The polymer electrolyte fuel cell of claim 1, wherein
    the ribbed plate coated with the water-retaining layer is formed using a mold from a resin-carbon mixture without baking.

11. The polymer electrolyte fuel cell of claim 10, wherein
    the carbon comprises a material selected from the group consisting of graphite, expanded graphite, carbon black, and mixtures of two or more thereof.

12. A polymer electrolyte fuel cell comprising:
    a cell including an electrolyte membrane and two electrodes which are disposed on two surfaces of the electrolyte membrane;
    a first ribbed plate having a plurality of ribs on a surface facing one of the two electrodes of the cell; and
    a second ribbed plate having a plurality of ribs on a surface facing the other of the two electrodes, wherein
    a water-retaining layer is formed to coat one or more tops of the plurality of ribs of at least one of the first ribbed plate and the second ribbed plate, the water-retaining layer having ability to retain water per unit active area of the two electrodes in a range of 0.01 g/cm$^2$ to 0.03 g/cm$^2$.

13. The polymer electrolyte fuel cell of claim 12, wherein
    the water-retaining layer is a porous layer made of a resin-carbon mixture, and
    ratio of resin to carbon in the resin-carbon mixture is 10% to 20% by weight on a percentage basis.

14. A polymer electrolyte fuel cell comprising:
    a cell including an electrolyte membrane and two electrodes which are disposed on two surfaces of the electrolyte membrane;
    a first ribbed plate having a plurality of ribs on a surface facing one of the two electrodes of the cell; and
    a second ribbed plate having a plurality of ribs on a surface facing the other of the two electrodes, wherein
    a water-retaining layer is formed to coat one or more tops and sides of the plurality of ribs of at least one of the first ribbed plate and the second ribbed plate, the water-retaining layer having ability to retain water per unit active area of the two electrodes in a. range of 0.002 g/cm$^2$ to 0. 035 g/cm$^2$.

15. The polymer electrolyte fuel cell of claim 14, wherein
    the water-retaining layer is further formed between the plurality of ribs on a surface of the at least one of the first ribbed plate and the second ribbed plate.

16. The polymer electrolyte fuel cell of claim 15, wherein
    the water-retaining layer is a porous layer made of a resin-carbon mixture, and
    ratio of resin to carbon in the resin-carbon mixture is 5% to 40% by weight on a percentage basis.

17. A polymer electrolyte fuel cell comprising:
    a cell including an electrolyte membrane and two electrodes which are disposed on two surfaces of the electrolyte membrane;

a first ribbed plate having a plurality of ribs on a surface facing one of the two electrodes of the cell; and a second ribbed plate having a plurality of ribs on a surface facing the other of the two electrodes, wherein a water-retaining layer is formed to coat one or more tops and sides of the plurality of ribs of at least one of the first ribbed plate and the second ribbed plate, the water-retaining layer having ability to retain water per unit active area of the two electrodes in a range of 0.01 g/cm$^2$ to 0.03 g/cm$^2$.

18. The polymer electrolyte fuel cell of claim 17, wherein the water-retaining layer is further formed between the plurality of ribs on a surface of the at least one of the first ribbed plate and the second ribbed plate.

19. The polymer electrolyte fuel cell of claim 18, wherein the water-retaining layer is a porous layer made of a resin-carbon mixture, and ratio of resin to carbon in the resin-carbon mixture is 10% to 20% by weight on a percentage basis.

20. The polymer electrolyte fuel cell of claim 2, wherein the ribbed plate coated with the water-retaining layer is formed from metal.

21. The polymer electrolyte fuel cell of claim 5, wherein the ribbed plate coated with the water-retaining layer is formed from metal.

22. The polymer electrolyte fuel cell of claim 1, wherein the ribbed plate coated with the water-retaining layer is formed from metal.

* * * * *